United States Patent
Miller et al.

(10) Patent No.: US 8,746,898 B2
(45) Date of Patent: Jun. 10, 2014

(54) PROJECTOR WITH SHUTTER

(75) Inventors: Joshua O. Miller, Woodinville, WA (US); Scott Woltman, Lynnwood, WA (US)

(73) Assignee: Microvision, Inc., Redmond, WA (US)

( * ) Notice: Subject to any disclaimer, the term of this patent is extended or adjusted under 35 U.S.C. 154(b) by 232 days.

(21) Appl. No.: 13/465,236

(22) Filed: May 7, 2012

(65) Prior Publication Data

US 2013/0293591 A1 Nov. 7, 2013

(51) Int. Cl.
*G03B 21/28* (2006.01)

(52) U.S. Cl.
USPC ............ 353/99; 353/30; 353/31; 353/88; 353/94; 353/95; 359/196.1; 359/197.1; 359/199.4; 359/242

(58) Field of Classification Search
CPC ...... G03B 21/28; G03B 21/14; G02F 1/1335; G02B 27/2235; G02B 27/225; G02B 2027/0132; G02B 2027/014; G02B 15/00
USPC ........... 353/30, 31, 37, 39, 46, 69, 70, 88, 94, 353/95, 99; 359/196.1, 197.1, 199.4, 202.1, 359/204.1, 242, 243, 245; 348/743–747; 349/5, 7–9
See application file for complete search history.

(56) References Cited

U.S. PATENT DOCUMENTS

| | | | |
|---|---|---|---|
| 5,214,457 A * | 5/1993 | Takanashi et al. | 353/31 |
| 5,565,668 A * | 10/1996 | Reddersen et al. | 235/462.22 |
| 6,900,916 B2 * | 5/2005 | Okazaki et al. | 359/202.1 |
| 8,444,275 B2 * | 5/2013 | Kurtz et al. | 353/85 |
| 8,506,090 B2 * | 8/2013 | Nicoli et al. | 353/69 |
| 2007/0120983 A1 * | 5/2007 | Yamamoto et al. | 348/208.99 |
| 2007/0145136 A1 * | 6/2007 | Wiklof et al. | 235/454 |
| 2009/0046140 A1 * | 2/2009 | Lashmet et al. | 348/51 |
| 2012/0200833 A1 * | 8/2012 | Imai | 353/30 |

* cited by examiner

*Primary Examiner* — Sultan Chowdhury
(74) *Attorney, Agent, or Firm* — Kevin D. Wills (57) ABSTRACT

A projection apparatus includes a shutter mechanism to prevent light from reaching an image plane during calibration of light sources. The shutter mechanism may include liquid crystal material that exhibits an effective index of refraction that varies with applied voltage. During calibration, a light beam is shuttered, light sources are driven by calibration data, and optical power is measured.

13 Claims, 11 Drawing Sheets

PROJECTOR WITH SHUTTER

FIELD

The present invention relates generally to projection systems, and more specifically to projection systems that calibrate light sources.

BACKGROUND

The amount of light produced by laser light sources used in projectors may vary over time based on factors such as age and temperature. In an attempt to overcome these variations, laser light sources may be "calibrated" periodically to determine their operating characteristics, and then laser light source drive values can be adjusted accordingly. One method of calibration includes measuring the actual amount of light produced when driving the laser light source with a known value (sometimes referred to as a "calibration value" or a "calibration pulse"). If light from calibration pulses escapes the projector into a user's field of view, then undesirable image artifacts may result.

DESCRIPTION OF EMBODIMENTS

In the following detailed description, reference is made to the accompanying drawings that show, by way of illustration, specific embodiments in which the invention may be practiced. These embodiments are described in sufficient detail to enable those skilled in the art to practice the invention. It is to be understood that the various embodiments of the invention, although different, are not necessarily mutually exclusive. For example, a particular feature, structure, or characteristic described herein in connection with one embodiment may be implemented within other embodiments without departing from the scope of the invention. In addition, it is to be understood that the location or arrangement of individual elements within each disclosed embodiment may be modified without departing from the scope of the invention. The following detailed description is, therefore, not to be taken in a limiting sense, and the scope of the present invention is defined only by the appended claims, appropriately interpreted, along with the full range of equivalents to which the claims are entitled. In the drawings, like numerals refer to the same or similar functionality throughout the several views.

Figure 1:
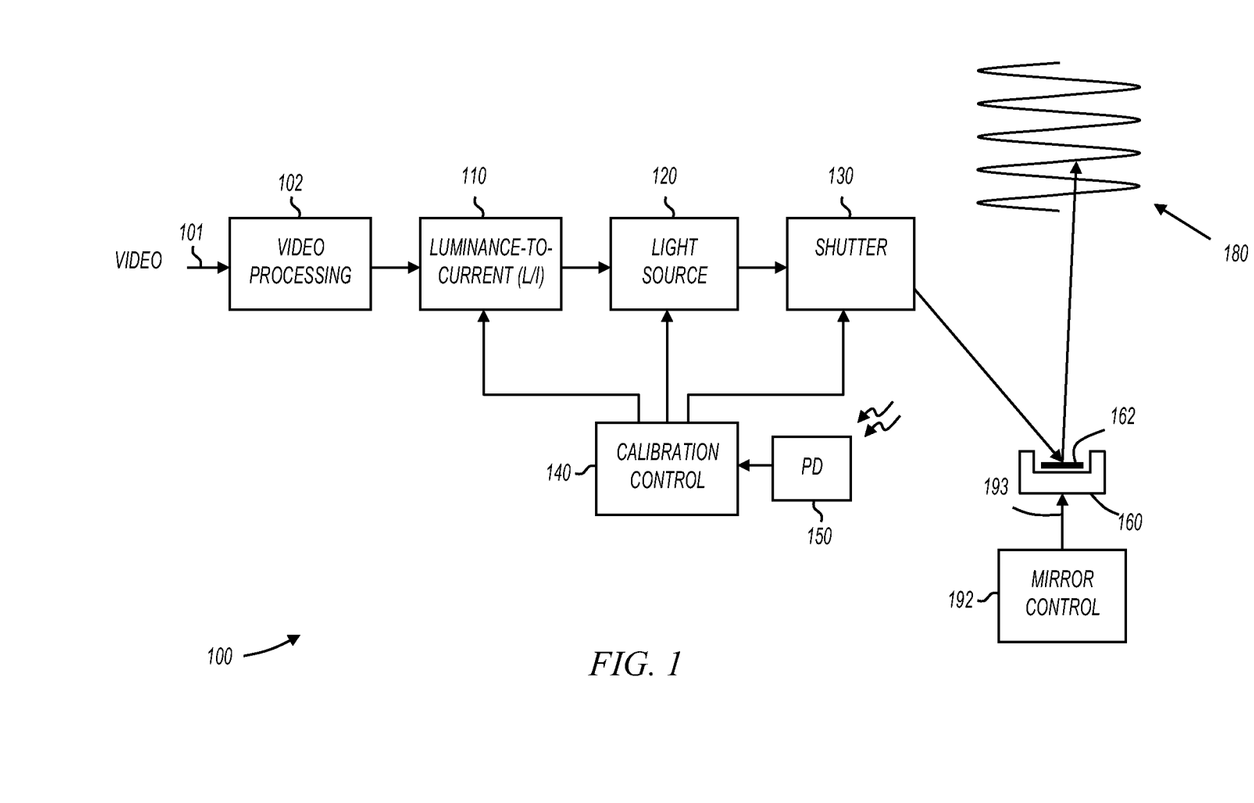
FIG. 1 shows a projection apparatus with a shutter mechanism in accordance with various embodiments of the present invention.

FIG. 1 shows a projection apparatus with a shutter mechanism in accordance with various embodiments of the present invention. Apparatus 100 includes video processing component 102, luminance-to-current (L/I) mapping component 110, light source 120, shutter mechanism 130, microelectromechanical machine (MEMS) device 160 having scanning mirror 162, mirror control circuit 192, photodetector 150, and calibration control circuits 140.

In operation, video processing component 102 receives video data on node 101 and produces display pixel data representing luminance values of pixels that are to be displayed. The video data 101 represents image source data that is typically received with pixel data on a rectilinear grid, but this is not essential. For example, video data 101 may represent a grid of pixels at any resolution (e.g., 640×480, 848×480, 1280×720, 1920×1080). Projection apparatus 100 is a scanning projector that scans a raster pattern. The raster pattern does not necessarily align with the rectilinear grid in the image source data, and video processing component 102 operates to produce display pixel data that will be displayed at appropriate points on the raster pattern. For example, in some embodiments, video processing component 102 interpolates vertically and/or horizontally between pixels in the source image data to determine display pixel values along the scan trajectory of the raster pattern.

Video processing component 102 may include any circuitry capable of performing the functions described. For example, in some embodiments, video processing component 102 includes digital circuits capable of performing interpolation such as multipliers, shifters, and adders. Also for example, in some embodiments, video processing component 102 may include hardware circuits and may also include a processor that executes instructions.

Luminance-to-current mapping component 110 receives luminance values from video processing component 102, and maps the luminance values to drive current values to drive light source 120. In some embodiments, L/I mapping component 110 includes a look-up table that maps luminance values to current values. The look-up table may be implemented in any fashion, including a semiconductor memory device. Luminance-to-current mapping component 110 may also include a digital-to-analog converter (DAC) to convert digital current values to analog currents. In some embodiments, L/I mapping component 110 stores values that are generated from data captured during a calibration period. Calibration is described further below.

Light source 120 receives drive current values from L/I mapping component 110 and produces light having grayscale values in response thereto. Light source 120 may be monochrome or may include multiple different color light sources. For example, in some embodiments, light source 120 includes red, green, and blue light sources. In these embodiments, video processing component 102 outputs display pixel data corresponding to each of the red, green, and blue light sources. Also for example, light produced by light source 120 may be visible or nonvisible. For example, in some embodiments, one or more sources of light within light source 120 may produce infrared (IR) light. In some embodiments, light source 120 may include one or more laser light producing devices. For example, in some embodiments, the light source 120 may include laser diodes.

The light from light source 120 is directed to mirror 162 through shutter mechanism 130. In some embodiments, additional optical elements are included in the light path between light source 120 and mirror 162. For example, apparatus 100 may include collimating lenses, dichroic mirrors, or any other suitable optical elements. Shutter mechanism 130 operates to conditionally "shutter" the light produced by light source 120 and to keep the light from reaching an image plane shown at 180. Shutter mechanism 130 is shown in the light path between the light source 120 and mirror 162, although this is not a limitation of the present invention. For example, shutter mechanism 130 may be located in a scanned beam path after mirror 162. These and other embodiments are described more fully below.

Shutter mechanism 130 may be any shutter that blocks or reflects light to keep the light from reaching the image plane. Examples include, but are not limited to, mechanical shutter devices, electrically operated shutter devices, and liquid crystal shutter devices. Various types of shutter mechanisms are described more fully below.

Scanning mirror 162 deflects on two axes in response to electrical stimuli received on node 193 from mirror control circuits 192. While moving on the two axes, scanning mirror 162 reflects light provided by light source 120. The reflected light sweeps a raster pattern and creates a resultant display in an image plane at 180. The shape of the raster pattern swept by scanning mirror 162 is a function of the mirror movement on its two axes. For example, in some embodiments, scanning mirror 162 sweeps in a first dimension (e.g., vertical dimension) in response to sawtooth wave stimulus, resulting in a substantially linear and unidirectional vertical sweep. Also for example, in some embodiments, scanning mirror 162 sweeps in a second dimension (e.g., horizontal dimension) according to a sinusoidal stimulus, resulting in a substantially sinusoidal horizontal sweep. An example of this type of mirror movement is described more fully below with reference to FIG. 2.

MEMS device 160 is an example of a scanning mirror assembly that scans light in two dimensions. In some embodiments the scanning mirror assembly includes a single mirror that scans in two dimensions (e.g., on two axes). Alternatively, in some embodiments, MEMS device 160 may be an assembly that includes two scan mirrors, one which deflects the beam along one axis, and another which deflects the beam along a second axis largely perpendicular to the first axis.

Photodetector 150 is a light measurement device that measures the amount of light power produced by light source 120. Photodetector 150 may be placed anywhere in projection system 100 to accomplish this function. For example, in some embodiments, photodetector 150 is placed in the light path near light source 120, and in other embodiments, photodetector 150 is placed in the light path near shutter mechanism 130. Further, in some embodiments, multiple photodetectors are employed. Examples are described more fully below.

Calibration control circuits 140 include circuits that function to calibrate light source 120 by commanding a known luminance value, measuring actual optical power, and then modifying the contents of luminance-to-current mapping component 110 to compensate for the difference. Calibration control circuits 140 may include hardware, software, or any combination. For example, in some embodiments, calibration control circuits 140 include digital state machines that control the calibration process. Further, in some embodiments, calibration control circuits 140 include a processor that executes instructions stored in a memory device.

One of the challenges often faced with controlling laser light sources is the ability to accurately produce the desired level of optical power, particularly when accounting for factors such as time and temperature. Various embodiments of the present invention provide a calibration mechanism to overcome these challenges. For example, calibration control circuits 140 may command shutter mechanism 130 to keep light from escaping the projection apparatus, and then command light source 120 to produce calibration pulses. Photodetector 150 may then measure the optical power produced as a result of the calibration pulses and provide the optical power information to calibration control circuits 140. Calibration control circuits 140 may then modify data in L/I mapping component 110 to compensate for operating characteristic variations of light source 120.

In some embodiments, calibration pulses are provided for a single luminance value, corresponding to a single point on the curve that represents the current operating characteristic of light source 120. This calibration pulse may be commanded to any level. In other embodiments, calibration pulses are provided for multiple luminance values, corresponding to multiple points on the curve that represents the current operating characteristic of light source 120. Calibration control circuits 140 may then perform a curve fitting operation to determine the data to be loaded in L/I mapping component 110.

The inclusion of shutter mechanism 130 within projection apparatus 100 allows for higher power calibration pulses and also allows for a longer time period in which to fire calibration pulses without the danger of light produced by the calibration pulses making it to the image plane and potentially distorting the projected image.

During a period while no video content is displayed, and while the light beam is being actively manipulated (shuttered) to prevent the beam from reaching the image plane, the control algorithms implemented by calibration control circuits 140 perform a calibration pulse or pulses to sample and collect laser L/I information at any intensity without disturbing the viewer. The calibration algorithm may then capture multiple points (luminance levels) on the L/I curve, providing real time L/I calibration.

In a bidirectional raster scanned display incorporating a linear vertical ramp drive, periods of no video content may occur during the horizontal overscan, vertical overscan, or vertical flyback. Calibration may be performed during these periods of no video content. Further, in some embodiments, projection system 100 periodically inserts a blank frame for greater periods available for calibration. This is possible in part because a typical user will not observe the difference between N frames and N−1 frames per second, where N represents a nominal number of frames per second produced by projection apparatus 100. The selected frame to be blanked may be randomized to further reduce any perceptible image artifacts.

Figure 2:
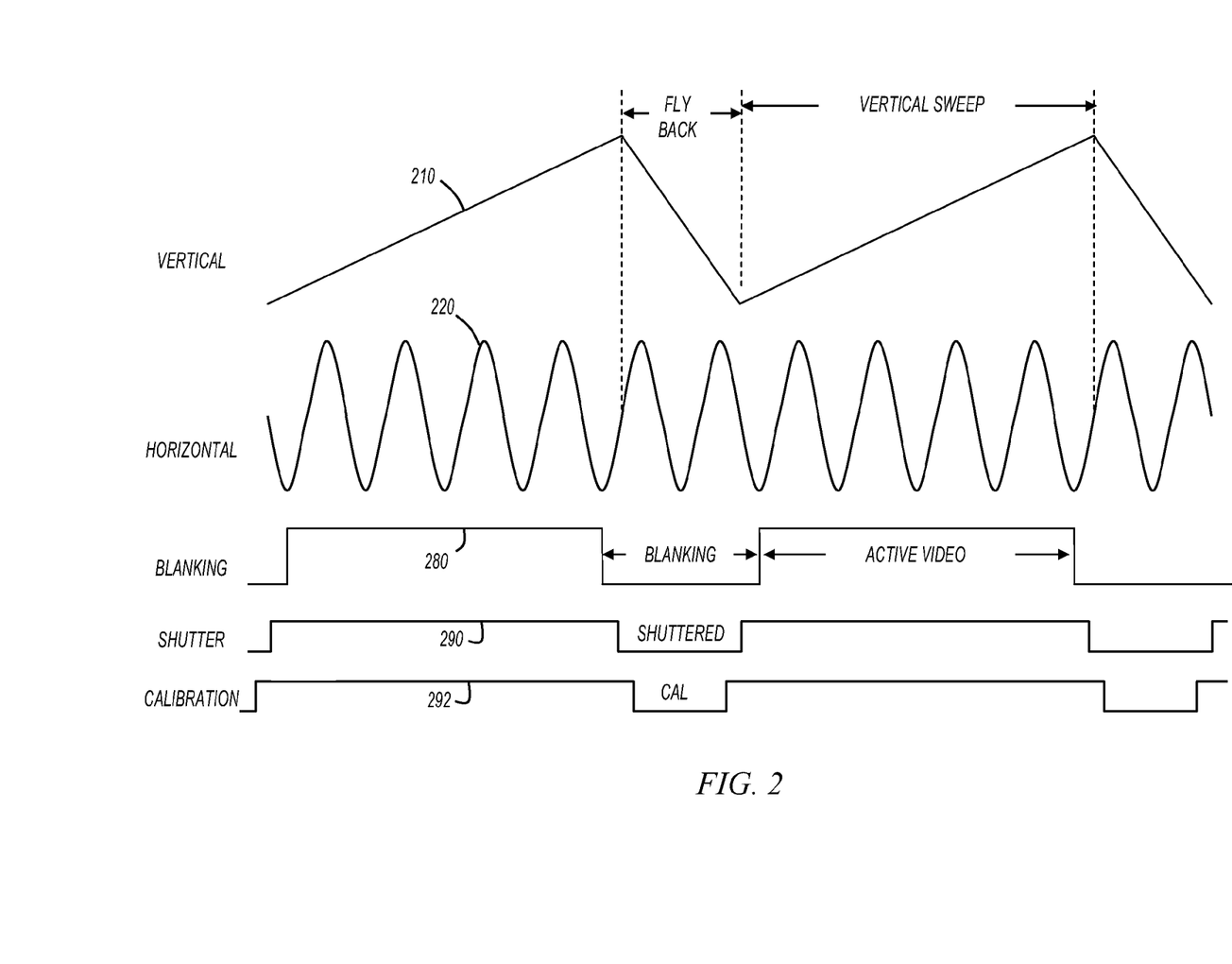
FIG. 2 shows a relationship between scanning deflection waveforms, video blanking, shuttering, and calibration in accordance with various embodiments of the present invention.

FIG. 2 shows a relationship between scanning deflection waveforms, video blanking, shuttering, and calibration in accordance with various embodiments of the present invention. Vertical deflection waveform 210 is a sawtooth waveform, and horizontal deflection waveform 220 is a sinusoidal waveform. When mirror 162 is deflected on its vertical and horizontal axes according to the waveforms 210 and 220, the scanned beam trajectory shown in FIG. 1 results.

Deflection of mirror 162 according to waveforms 210 and 220 may be achieved by driving MEMS device 160 with the appropriate drive signals. In some embodiments, the horizontal deflection frequency is at a resonant frequency of the mirror and a very small excitation at that frequency will result in the desired scan angle. A sawtooth drive signal for the vertical deflection may be derived from a sum of sine waves at various frequencies. The drive signal for the vertical deflection may also be derived from specific points programmed into a waveform generator.

Although a sawtooth drive signal will result in the vertical deflection shown in FIG. 2, other drive signal embodiments exist. For example, in some embodiments, the vertical drive signal may be triangle wave (where subsequent frames are written top to bottom followed by bottom to top alternating each frame) or sinusoidal waveforms.

Sawtooth vertical deflection waveform 210 includes vertical sweep portions and flyback portions. In some embodiments, pixels are displayed during the vertical sweep portions, and not during the flyback portions. The flyback portions correspond to the beam "flying back" to the top of the image field of view. Blanking waveform 280 is also shown in FIG. 2. The scanned beam is blanked (no pixels are displayed) during flyback, and is not blanked during the vertical sweep.

During the blanking period, the shutter mechanism 130 is actuated as shown by waveform 290. This corresponds to calibration control circuits 140 (FIG. 1) commanding shutter mechanism 130 to shutter the light beam during a period when no pixel data is present to prevent light from escaping to the image plane during calibration.

While the light beam is shuttered, calibration may take place as shown at 292. Calibration during flyback provides sufficient time to fire multiple calibration pulses. In some embodiments, multiple calibration pulses are fired for each color (e.g., red, green, blue). In other embodiments, one color is calibrated during each flyback period.

Shutter operation is shown during a flyback period in FIG. 2, although this is not a limitation of the present invention. For example, in some embodiments, the shutter is actuated during horizontal overscan periods. This corresponds to times at which waveform 220 is at peaks and troughs. In general, the light beam may be shuttered at any time during projection, and calibration may take place at any time during which the light beam is shuttered.

For clarity of explanation, FIG. 2 shows only a few horizontal cycles per vertical sweep. In practice, many more horizontal cycles are present. For example, a horizontal resonant frequency of 24.5 kHz and a frame rate of 60 Hz will yield about 408 horizontal cycles per vertical sweep.

Figure 3:
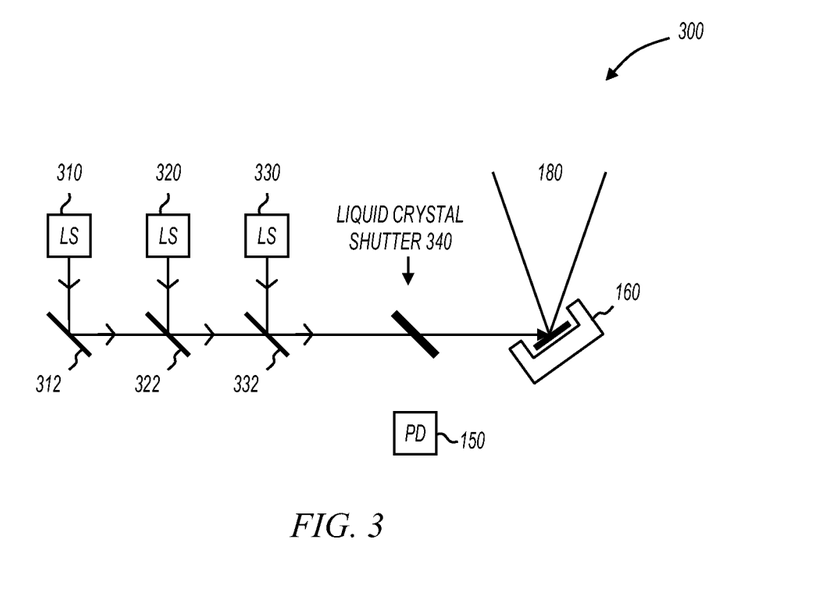
FIGS. 3 and 4 show operating modes of a scanning laser projector with a liquid crystal shutter.
Figure 4:
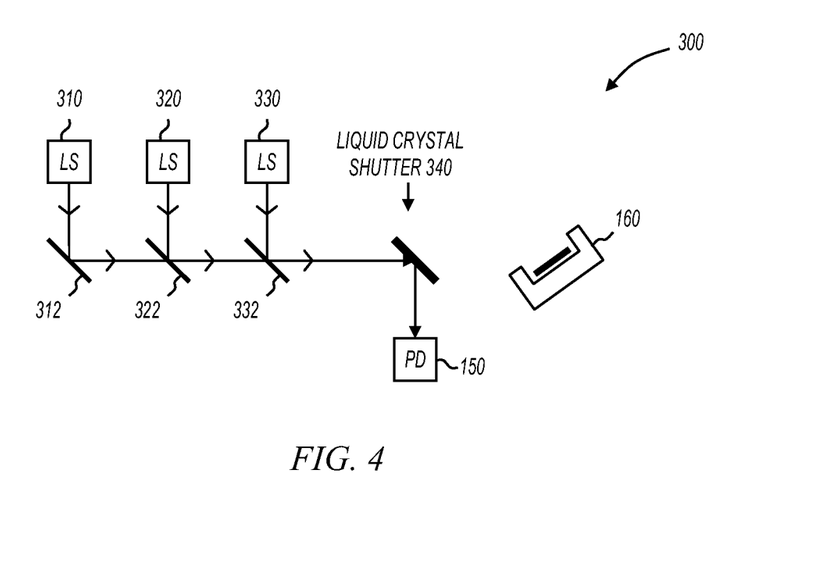

FIGS. 3 and 4 show operating modes of a scanning laser projector with a liquid crystal shutter in a nonscanned beam path. Scanning laser projector 300 includes laser light sources 310, 320, and 330, mirrors 312, 322, and 332, liquid crystal shutter 340, photodetector 150, and MEMS device 160. Image plane 180 is also shown in FIG. 3 as receiving the light scanned by MEMS device 160.

Laser light sources 310, 320, and 330 represent sources of different color light. For example, in some embodiments, light source 310 is a green laser diode, light source 320 is a red laser diode, and light source 330 is a blue laser diode. Mirrors 312, 322, 332 operate to combine the light of different wavelengths into a single collimated beam that impinges on liquid crystal shutter 340. In some embodiments, one or more of mirrors 312, 322, and 332 are dichroic mirrors. In some embodiments, other optical devices are used to combine the laser light.

Liquid crystal shutter 340 is an example of a shutter mechanism that can be used for shutter mechanism 130 (FIG. 1). For clarity and ease of explanation, the interactions between calibration control circuits 140 and the various blocks of FIGS. 3 and 4 are not pictured. During operation, a calibration control circuit may be coupled to drive light sources 310, 320, and 330 with calibration data, and the calibration control circuit may also be coupled to control liquid shutter 340, and to receive light power data from photodetector 150.

As shown in FIG. 3, liquid crystal shutter 340 is in a transmissive state. When liquid crystal shutter 340 is transmissive, the light beam impinges on the scanning mirror and is then shone into the image plane 180. The operating state represented by FIG. 3 is a state in which the projection apparatus is displaying an image. For example, liquid crystal shutter 340 may be in the transmissive state when display data is present during the vertical sweep (FIG. 2).

As shown in FIG. 4, liquid crystal shutter 340 is in a reflective state. Rather than transmit the light beam to the scanning mirror, liquid crystal shutter 340 reflects the light beam to photodetector 150. The operating state represented by FIG. 4 is a state in which the projection apparatus is not displaying an image. For example, liquid crystal shutter 340 may be put in the reflective state when display data is not present, and/or during calibration.

Although FIGS. 3 and 4 show the transmissive state of liquid crystal shutter 340 corresponding to image projection, and the reflective state corresponding to calibration, this is not a limitation of the present invention. For example, in some embodiments, the placement of MEMS device 160 and photodetector 150 are swapped such that an image is displayed when liquid crystal shutter 340 is in the reflective state.

As described further below with reference to FIGS. 4 and 5, in some embodiments, liquid crystal shutter 340 employs the concept of total internal reflection. In these embodiments, liquid crystal shutter 340 is made of a material that has an effective index of refraction that is voltage dependent. The angle of incidence of the light beam is selected such that in one state, the light beam passes through liquid crystal shutter 340, and in another state, the light beam is reflected because of the modified effective index of refraction of liquid crystal material within liquid crystal shutter 340.

Figure 5:
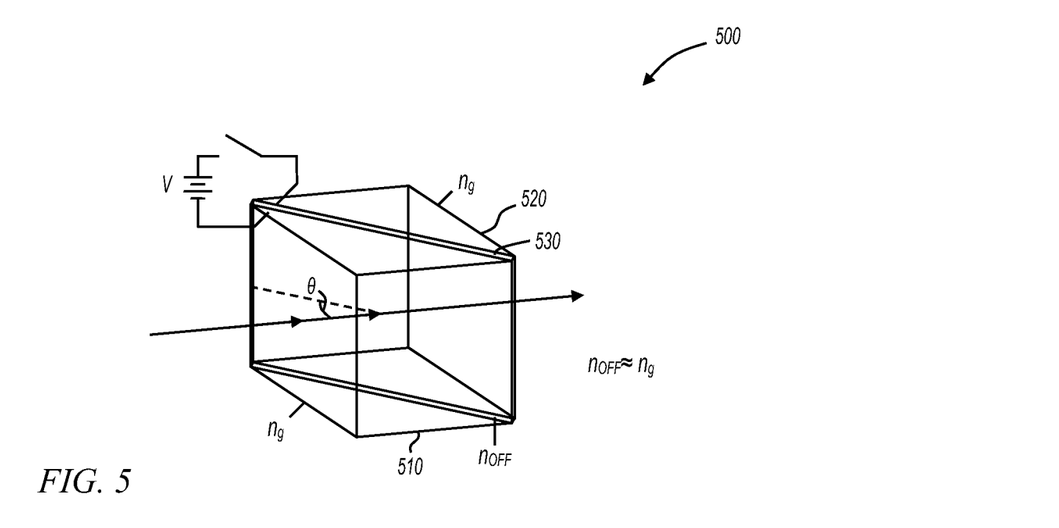
FIG. 5 shows a liquid crystal shutter device transmitting a light beam.
Figure 6:
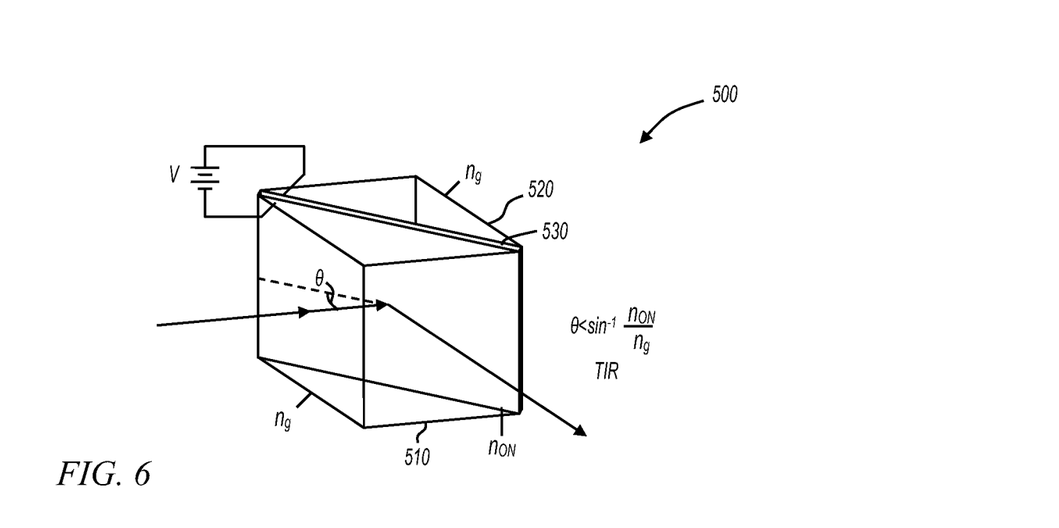
FIG. 6 shows a liquid crystal shutter device reflecting a light beam.

FIG. 5 shows a liquid crystal shutter device transmitting a light beam, and FIG. 6 shows the same liquid crystal shutter device reflecting the light beam. Liquid crystal shutter device 500 is an example liquid crystal device that may be used for liquid crystal shutter 130 (FIG. 1) or liquid crystal shutter 340 (FIGS. 3, 4). Liquid crystal shutter device 500 includes prisms 510 and 520, and liquid crystal device 530. Prisms 510 and 520 are wedge shaped components made of optically transmissive material, e.g., glass. The index of refraction of prisms 510 and 520 is shown as $n_g$. Liquid crystal device 530 includes a liquid crystal material that exhibits an effective index of refraction that varies with applied voltage. For example, ferroelectric liquid crystal (FLC) material may be used.

The index of refraction of liquid crystal device 530 is defined and fixed by the liquid crystal molecules within the liquid crystal device. The application of a voltage induces a change in the orientation of the liquid crystal molecules, and this results in a different effective index of refraction experienced by a light beam. Accordingly, the term "effective index of refraction" as used herein refers to a voltage dependent index of refraction as seen by a light beam.

Prisms 510 and 520 each share a planar optical interface with liquid crystal device 530. Transparent electrodes are placed at the optical interfaces to allow for the application of a voltage V across liquid crystal device 530. Polarizers may or may not be included at the optical interfaces. In some embodiments, a single polarizer is included at the optical interface between prism 510 and liquid crystal device 530.

As shown in FIG. 5, the light beam strikes the first prism 510 at a substantially normal angle, although this is not a limitation of the present invention. For example, various embodiments of the invention operate in accordance with the teachings herein with the light beam striking the first prism 510 at non-normal angles of incidence. After entering the first prism 510, the light beam strikes the optical interface at the junction between prism 510 and liquid crystal device 530 at a non-normal angle of incidence $\theta$. Depending on the angle of incidence $\theta$ and the indices of refraction of all of the materials, the light beam will be either refracted into the liquid crystal device 530 and the second prism 520 or reflected via total internal reflection. The liquid crystal and prism materials could thus be selected, along with the angle of incidence, to result in the desired optical effect.

As shown in FIG. 5, the effective index of refraction of the liquid crystal device 530 with no voltage applied is given by $n_{OFF}$ and the index of refraction of the prisms is given by $n_g$. These indices of refraction are equal or close enough in value such that at the chosen angle of incidence $\theta$, the light beam is not reflected at the optical interface between prism 510 and liquid crystal device 530. In FIG. 5, the indices of refraction are shown as equal, although this is not a limitation of the present invention.

As shown in FIG. 6, the effective index of refraction of the liquid crystal device 530 with voltage V applied is given by $n_{ON}$ and the index of refraction of the prisms is given by $n_g$. The indices of refraction and the angle of incidence $\theta$ are chosen such that $$\theta < \sin^{-1} \frac{n_{ON}}{n_g}. \quad (1)$$

When equation (1) is satisfied, the light beam is reflected off the optical interface via total internal reflection (TIR).

Although liquid crystal shutter 500 is shown in a transmissive state when no voltage is applied, and a reflective state when voltage V is applied, this is not a limitation of the present invention. For example, liquid crystal shutter 500 may be in a reflective state when no voltage is applied, and may be in a transmissive state when a voltage is applied.

In some embodiments, the application of voltage V is controlled by calibration control circuits 140 (FIG. 1). The light beam may be shuttered during a time when no display data is present, and/or when calibration pulses are provided. When shuttered, the light beam may be directed to a light measuring component such as a photodetector, or may be directed to a device that absorbs the light to keep it from escaping from a projection device.

Figure 7:
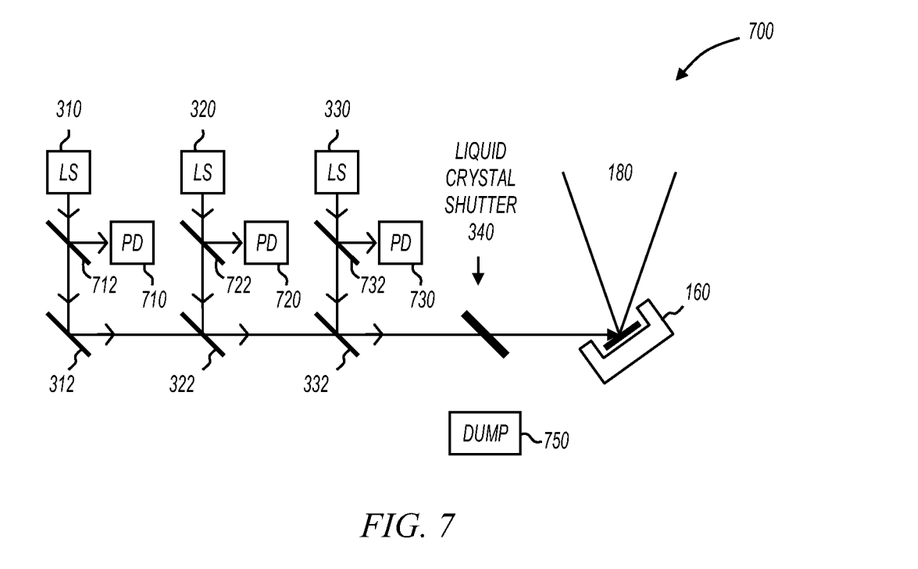
FIGS. 7 and 8 show operating modes of a scanning laser projector with a liquid crystal shutter in a nonscanned beam path.
Figure 8:
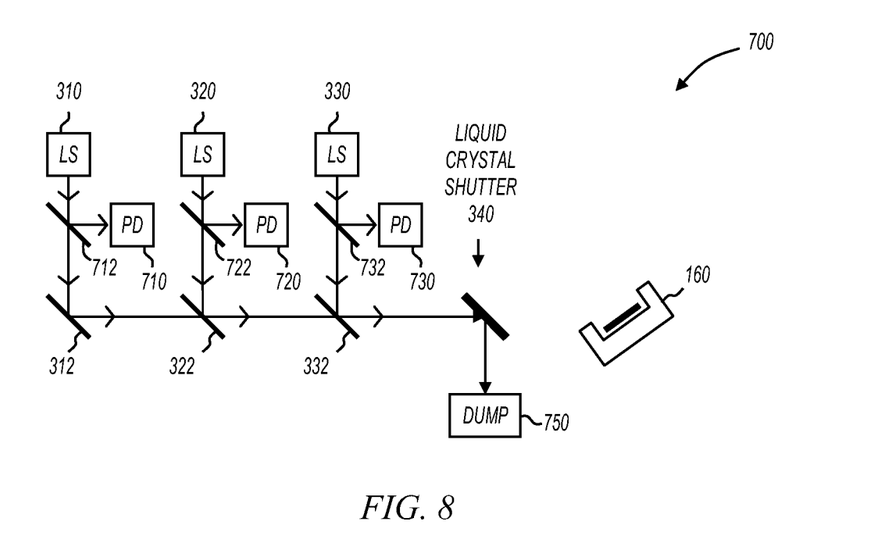

FIGS. 7 and 8 show operating modes of a scanning laser projector with a liquid crystal shutter in a nonscanned beam path. Scanning laser projector 700 includes light sources 310, 320, and 330, mirrors 312, 322, and 332, liquid crystal shutter 340, and MEMS device 160, all of which are described above with reference to earlier figures. Scanning laser projector 700 also includes mirrors 712, 722, and 732, photodetectors 710, 720, and 730, and beam dump device 750.

Mirror 712 reflects less than all light produced by light source 310 to photodetector 710; mirror 722 reflects less than all light produced by light source 320 to photodetector 720; and mirror 732 reflects less than all light produced by light source 330 to photodetector 730. This allows monitoring of light power produced by the light sources at all times (during calibration or not) at the expense of system efficiency. In some embodiments, the percentage of light reflected to the photodetectors is very small (e.g., a few percent).

As shown in FIG. 7, liquid crystal shutter 340 is in a transmissive state, and MEMS device 160 is reflecting light to project an image into image plane 180. In this state, projection device 700 may still monitor individual light source output power.

As shown in FIG. 8, liquid crystal shutter 340 is in a reflective state, and "shutters" the light beam by reflecting it to beam dump device 750. Beam dump device 750 is any device that can absorb or dissipate the light in such a way that it is kept from escaping projection device 700.

Figure 9:
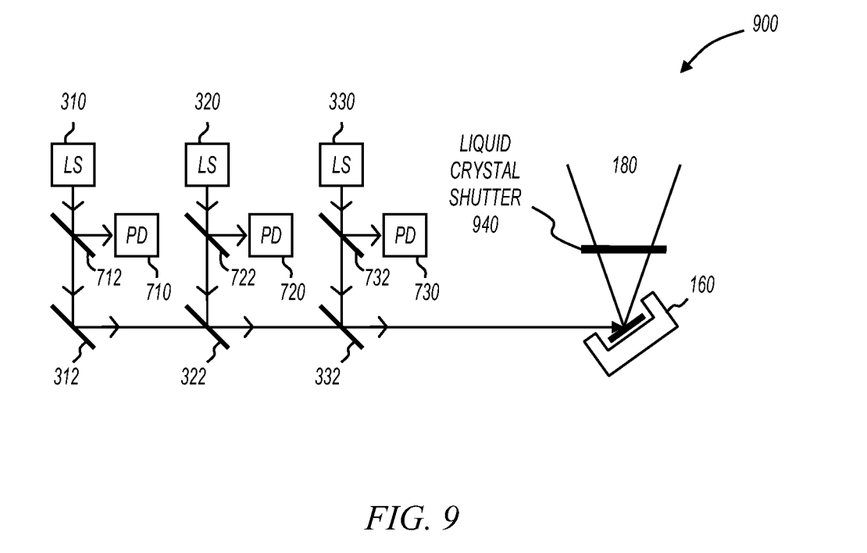
FIGS. 9 and 10 show operating modes of a scanning laser projector with a liquid crystal shutter in a scanned beam path.
Figure 10:
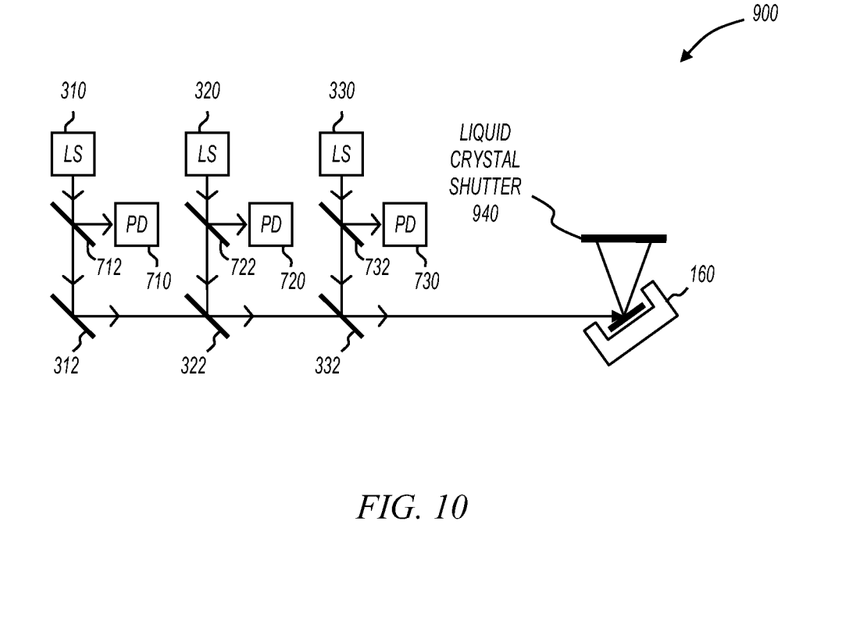

FIGS. 9 and 10 show operating modes of a scanning laser projector with a liquid crystal shutter in a scanned beam path. Scanning laser projector 900 includes light sources 310, 320, and 330, mirrors 312, 322, and 332, mirrors 712, 722, and 732, photodetectors 710, 720, and 730, and MEMS device 160, all of which are described above with reference to earlier figures. Scanning laser projector 900 also includes liquid crystal shutter 940. Liquid crystal shutter 940 is a shutter mechanism that is positioned in the light beam path after the scanning mirror.

As shown in FIG. 9, liquid crystal shutter 940 may be transmissive to allow light to reach the image plane 180, and as shown in FIG. 10, liquid crystal shutter 940 may be non-transmissive to shutter light and keep it from reaching the image plane 180. In some embodiments, liquid crystal shutter 940 includes a liquid crystal material (e.g., ferroelectric liquid crystal) sandwiched between two linear polarizers. In some embodiments, liquid crystal shutter 940 is a monolithic component with polarizers adhered to the same substrate used to sandwich the liquid crystal material. As a linearly polarized light beam is transmitted through the liquid crystal, an appropriate voltage is applied, rotating the polarization state of the beam. As the polarization state of the beam is rotated through the liquid crystal, the output polarizer will begin attenuating the output beam. When the polarization state of the rotated beam is perpendicular to that of the output polarizer, the beam will achieve peak attenuation. Extinction ratios of 100:1 are relatively easy to accomplish with low cost optics, however 1000:1 or greater is typical within the industry.

Figure 11:
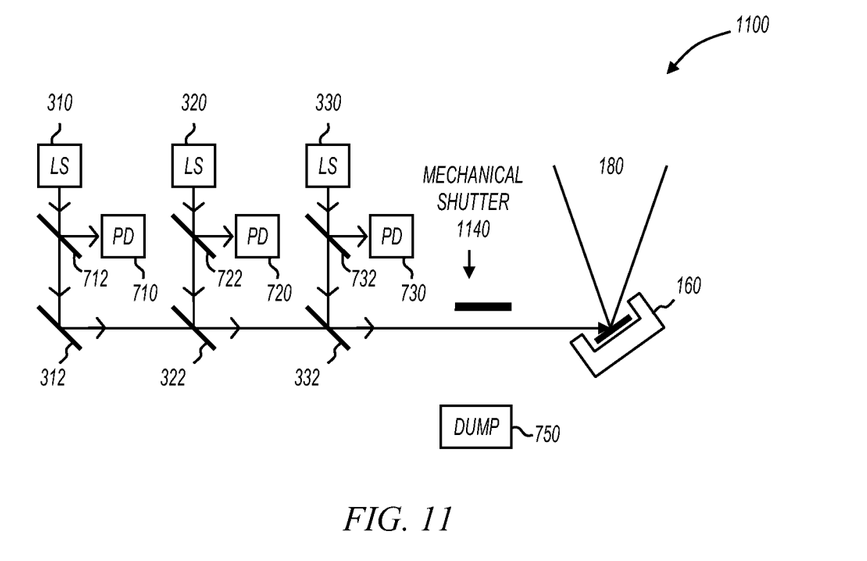
FIGS. 11 and 12 show operating modes of a scanning laser projector with a mechanical shutter.
Figure 12:
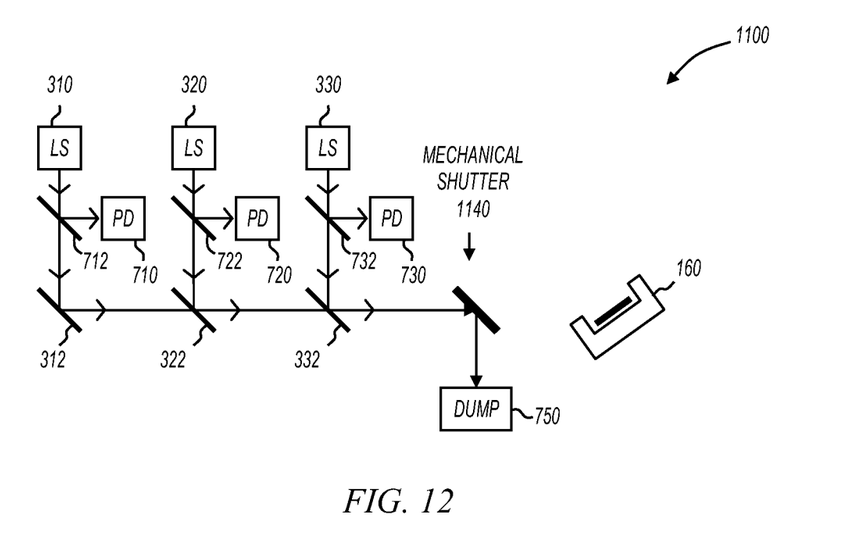

FIGS. 11 and 12 show operating modes of a scanning laser projector with a mechanical shutter. Scanning laser projector 1100 is similar to scanning laser projector 700 (FIGS. 7, 8) with the exception of mechanical shutter 1140. Mechanical shutter 1140 may be any type of mechanical device capable of conditionally blocking or reflecting the light to keep it from reaching the image plane. For example, mechanical shutter 1140 may rotate into place as shown in FIG. 12 in order to shutter the light beam by reflecting it to beam dump device 750.

Mechanical shutters are inherently slower than liquid crystal shutters described above; however mechanical shutters may be sufficiently fast as long as the calibration is of sufficient duration. For example, the flyback period may provide enough time for the beam to be mechanically shuttered while performing calibration.

In the above examples, light beams are attenuated or redirected to prevent significant light from reaching the viewable image plane during calibration. Any type of attenuation or redirection may be employed without departing from the scope of the present invention. For example, beam steering components may include electro-optic modulators, dynamically changing lenses (either in position of shape) and dynamically changing mirrors (either in position or shape). It should be understood that these components may also be used to accomplish other functions as well, for example, the primary function might be beam deflection as part of the scanned image. Whether having multiple functions or a single function, such a component could be located in the static beam path and manipulated such that during the projector's ON state, the component allowed the beam to be directed through the display system and the image plane, thus displaying the image. During the projector's OFF state and a period during which system can perform monitoring or calibration of the light source the component can be manipulated to prevent the static beam from being directed through the system.

Figure 13:
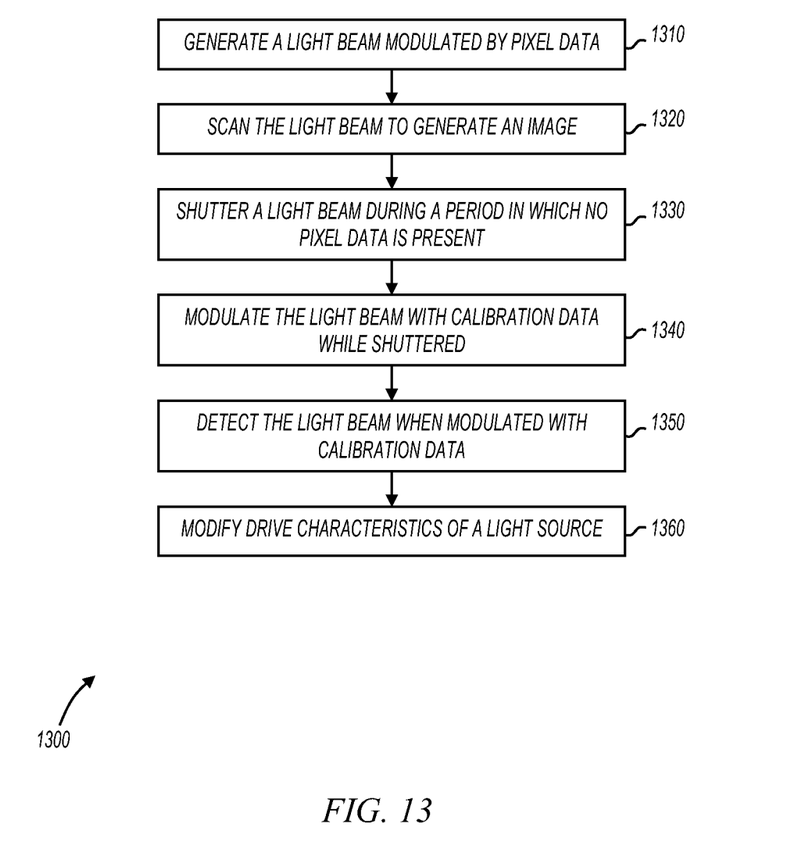
FIG. 13 shows a flow diagram of a method in accordance with various embodiments of the present invention.

FIG. 13 shows a flow diagram of methods in accordance with various embodiments of the present invention. In some embodiments, method 1300, or portions thereof, is performed by a scanning laser projection apparatus, embodiments of which are shown in previous figures. In other embodiments, method 1300 is performed by a series of circuits or an electronic system. Method 1300 is not limited by the particular type of apparatus performing the method. The various actions in method 1300 may be performed in the order presented, or may be performed in a different order. Further, in some embodiments, some actions listed in FIG. 13 are omitted from method 1300.

Method 1300 is shown beginning with block 1310. As shown at 1310, a light beam modulated by pixel data is generated. This is accomplished within a scanning laser projector such as projection apparatus 100 (FIG. 1) by driving light source 120 with drive current values that correspond to grayscale values. The light beam may be monochrome, color, visible, or nonvisible. Examples of scanning laser projectors with multiple light sources that can be modulated are also shown in FIGS. 3, 4, and 7-12.

At 1320, the light beam is scanned to generate an image. During the actions of 1320, the modulated light beam reaches the scanning mirror and also reaches the image plane after scanning. For example, during 1320 the various shutter mechanisms described above are put in a state that allows the light beam to reach the image plane. Depending on the embodiment, this may include actuating or de-actuating a shutter mechanism; applying or removing a voltage from a shutter mechanism; causing a shutter mechanism to be either transmissive or reflective; or causing a shutter mechanism to change shape or position.

At 1330, the light beam is shuttered during a period in which pixel data is present. This corresponds to putting a shutter mechanism into a state complementary to that described above with respect to 1320 in order to keep light from reaching the image plane. Depending on the embodiment, this may include actuating or de-actuating a shutter mechanism; applying or removing a voltage from a shutter mechanism; causing a shutter mechanism to be either transmissive or reflective; or causing a shutter mechanism to change shape or position. In some embodiments, this corresponds to calibration control circuits 140 (FIG. 1) commanding a shutter mechanism to shutter the light beam.

The period during which no pixel data is present may be a vertical flyback time, a vertical or horizontal overscan time, or any other time that pixel data is not present. This period may also be a time in which pixel data is purposely blanked for the purpose of calibration. For example, a blank frame may be periodically inserted to enable a longer calibration time. Pixel data is not present during the blank frame because it has been intentionally blocked.

At 1340, the light beam is modulated with calibration data while shuttered. This corresponds to calibration control circuits 140 (FIG. 1) commanding one or more light sources to emit one or more calibration pulses. In some embodiments, each of multiple light sources is commanded to produce calibration pulses of varying intensity in order to fully characterize the L/I behavior of the light source.

At 1350, the light beam modulated with calibration data is detected. This corresponds to a light measurement device such as a photodetector detecting that actual optical output power that results from the calibration pulses. One or more photodetectors may be located anywhere in the system. For example, one photodetector may be dedicated for each light source as shown in FIGS. 7-12, or one photodetector may be dedicated to measure light for all light sources as shown in FIGS. 3 and 4.

At 1360, drive characteristics of a light source are modified in response to the data collected at 1350. In some embodiments, this corresponds to modifying data stored in L/I mapping component 110 (FIG. 1).

The actions of method 1300 may be performed at any time. For example, method 1300 may be performed when a projection apparatus is manufactured to initially characterize laser light sources, and may also be performed during the lifetime of the device to compensate for changes in light source behavior as a result of age. Method 1300 may also be performed periodically during normal operation of the projection apparatus to compensate for changes that occur during operation (e.g., temperature dependent variations).

In some embodiments, different portions of method 1300 are performed periodically with different periods. For example, the light beam may be shuttered and calibration pulses may be fired during every flyback period, while the L/I mapping component may be updated less frequently. Further, different light sources may be calibrated with differing frequencies.

Figure 14:
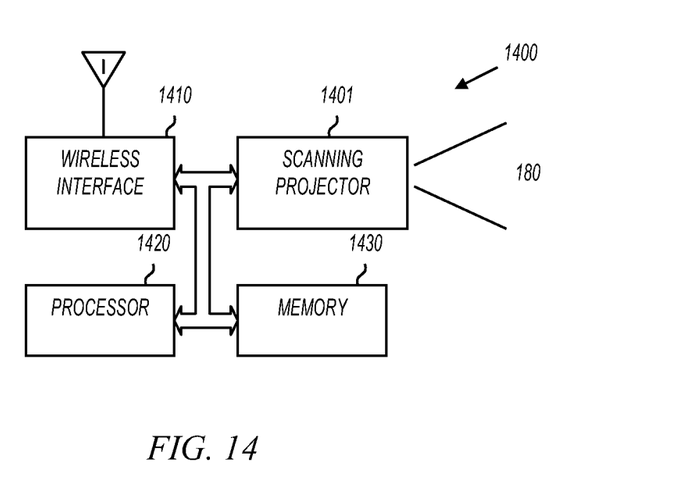
FIG. 14 shows a block diagram of a mobile device in accordance with various embodiments of the present invention.

FIG. 14 shows a block diagram of a mobile device in accordance with various embodiments of the present invention. As shown in FIG. 14, mobile device 1400 includes wireless interface 1410, processor 1420, memory 1430, and scanning projector 1401. Scanning projector 1401 paints a raster image at image plane 180. Scanning projector 1401 includes a shutter mechanism and calibration circuits as described above with reference to previous figures. Scanning projector 1401 may be any projection apparatus described herein.

Scanning projector 1401 may receive image data from any image source. For example, in some embodiments, scanning projector 1401 includes memory that holds still images. In other embodiments, scanning projector 1401 includes memory that includes video images. In still further embodiments, scanning projector 1401 displays imagery received from external sources such as connectors, wireless interface 1410, a wired interface, or the like.

Wireless interface 1410 may include any wireless transmission and/or reception capabilities. For example, in some embodiments, wireless interface 1410 includes a network interface card (NIC) capable of communicating over a wireless network. Also for example, in some embodiments, wireless interface 1410 may include cellular telephone capabilities. In still further embodiments, wireless interface 1410 may include a global positioning system (GPS) receiver. One skilled in the art will understand that wireless interface 1410 may include any type of wireless communications capability without departing from the scope of the present invention.

Processor 1420 may be any type of processor capable of communicating with the various components in mobile device 1400. For example, processor 1420 may be an embedded processor available from application specific integrated circuit (ASIC) vendors, or may be a commercially available microprocessor. In some embodiments, processor 1420 provides image or video data to scanning projector 1401. The image or video data may be retrieved from wireless interface 1410 or may be derived from data retrieved from wireless interface 1410. For example, through processor 1420, scanning projector 1401 may display images or video received directly from wireless interface 1410. Also for example, processor 1420 may provide overlays to add to images and/or video received from wireless interface 1410, or may alter stored imagery based on data received from wireless interface 1410 (e.g., modifying a map display in GPS embodiments in which wireless interface 1410 provides location coordinates).

Figure 15:
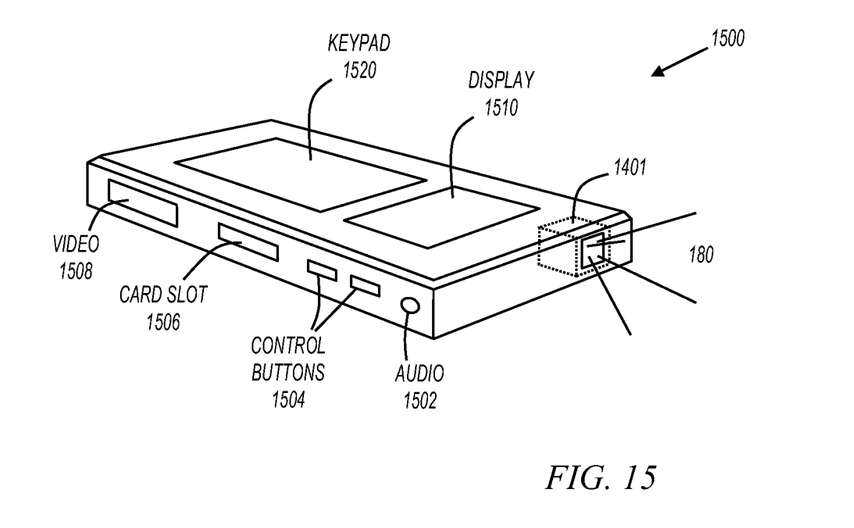
FIG. 15 shows a mobile device in accordance with various embodiments of the present invention.

FIG. 15 shows a mobile device in accordance with various embodiments of the present invention. Mobile device 1500 may be a hand held projection device with or without communications ability. For example, in some embodiments, mobile device 1500 may be a handheld projector with little or no other capabilities. Also for example, in some embodiments, mobile device 1500 may be a device usable for communications, including for example, a cellular phone, a smart phone, a personal digital assistant (PDA), a global positioning system (GPS) receiver, or the like. Further, mobile device 1500 may be connected to a larger network via a wireless (e.g., WiMax) or cellular connection, or this device can accept data messages or video content via an unregulated spectrum (e.g., WiFi) connection.

Mobile device 1500 includes scanning projector 1401 to create an image with light at image plane 180. Mobile device 1500 also includes many other types of circuitry; however, they are intentionally omitted from FIG. 15 for clarity.

Mobile device 1500 includes display 1510, keypad 1520, audio port 1502, control buttons 1504, card slot 1506, and audio/video (A/V) port 1508. None of these elements are essential. For example, mobile device 1500 may only include scanning projector 1401 without any of display 1510, keypad 1520, audio port 1502, control buttons 1504, card slot 1506, or A/V port 1508. Some embodiments include a subset of these elements. For example, an accessory projector product may include scanning projector 1401, control buttons 1504 and A/V port 1508.

Display 1510 may be any type of display. For example, in some embodiments, display 1510 includes a liquid crystal display (LCD) screen. Display 1510 may always display the same content projected at image plane 180 or different content. For example, an accessory projector product may always display the same content, whereas a mobile phone embodiment may project one type of content at image plane 180 while displaying different content on display 1510. Keypad 1520 may be a phone keypad or any other type of keypad.

A/V port 1508 accepts and/or transmits video and/or audio signals. For example, A/V port 1508 may be a digital port that accepts a cable suitable to carry digital audio and video data such as a high definition multimedia interface (HDMI) port. Further, A/V port 1508 may include RCA jacks to accept composite inputs. Still further, A/V port 1508 may include a VGA connector to accept analog video signals. In some embodiments, mobile device 1500 may be tethered to an external signal source through A/V port 1508, and mobile device 1500 may project content accepted through A/V port 1508. In other embodiments, mobile device 1500 may be an originator of content, and A/V port 1508 is used to transmit content to a different device.

Audio port 1502 provides audio signals. For example, in some embodiments, mobile device 1500 is a media player that can store and play audio and video. In these embodiments, the video may be projected at image plane 180 and the audio may be output at audio port 1502. In other embodiments, mobile device 1500 may be an accessory projector that receives audio and video at A/V port 1508. In these embodiments, mobile device 1500 may project the video content at image plane 180, and output the audio content at audio port 1502.

Mobile device 1500 also includes card slot 1506. In some embodiments, a memory card inserted in card slot 1506 may provide a source for audio to be output at audio port 1502 and/or video data to be projected at image plane 180. Card slot 1506 may receive any type of solid state memory device, including for example, Multimedia Memory Cards (MMCs), Memory Stick DUOS, secure digital (SD) memory cards, and Smart Media cards. The foregoing list is meant to be exemplary, and not exhaustive.

Figure 16:
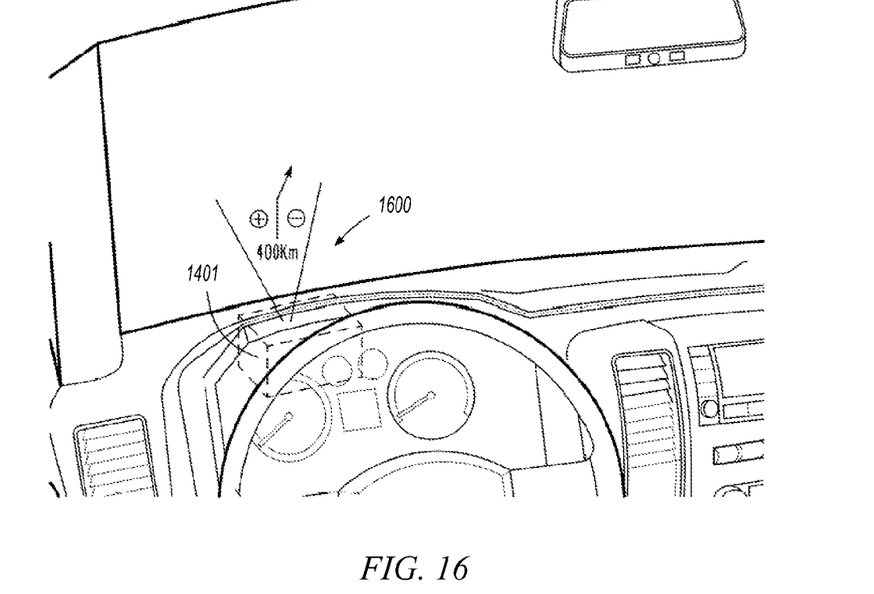
FIG. 16 shows a head-up display system in accordance with various embodiments of the invention.

FIG. 16 shows a head-up display system in accordance with various embodiments of the invention. Projector 1401 is shown mounted in a vehicle dash to project the head-up display at 1600. Although an automotive head-up display is shown in FIG. 16, this is not a limitation of the present invention. For example, various embodiments of the invention include head-up displays in avionics application, air traffic control applications, and other applications.

Figure 17:
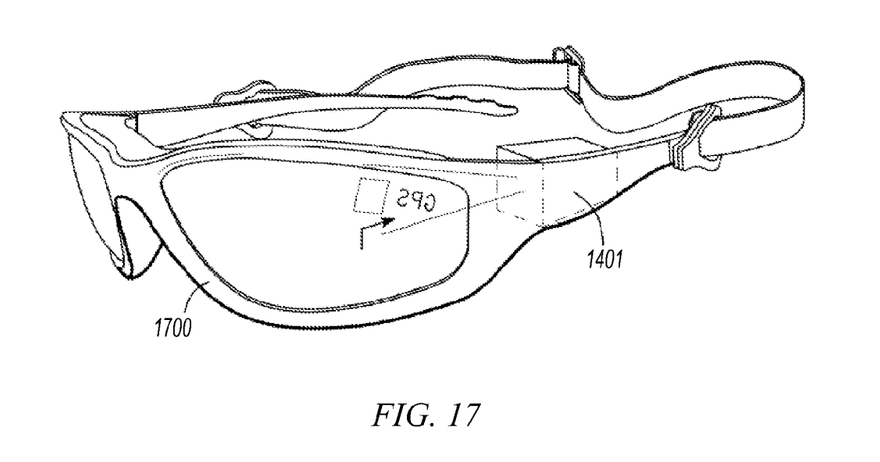
FIG. 17 shows eyewear in accordance with various embodiments of the invention.

FIG. 17 shows eyewear in accordance with various embodiments of the invention. Eyewear 1700 includes projector 1401 to project a display in the eyewear's field of view. In some embodiments, eyewear 1700 is see-through and in other embodiments, eyewear 1700 is opaque. For example, eyewear may be used in an augmented reality application in which a wearer can see the display from projector 1401 overlaid on the physical world. Also for example, eyewear may be used in a virtual reality application, in which a wearer's entire view is generated by projector 1401. Although only one projector 1401 is shown in FIG. 17, this is not a limitation of the present invention. For example, in some embodiments, eyewear 1700 includes two projectors; one for each eye.

Figure 18:
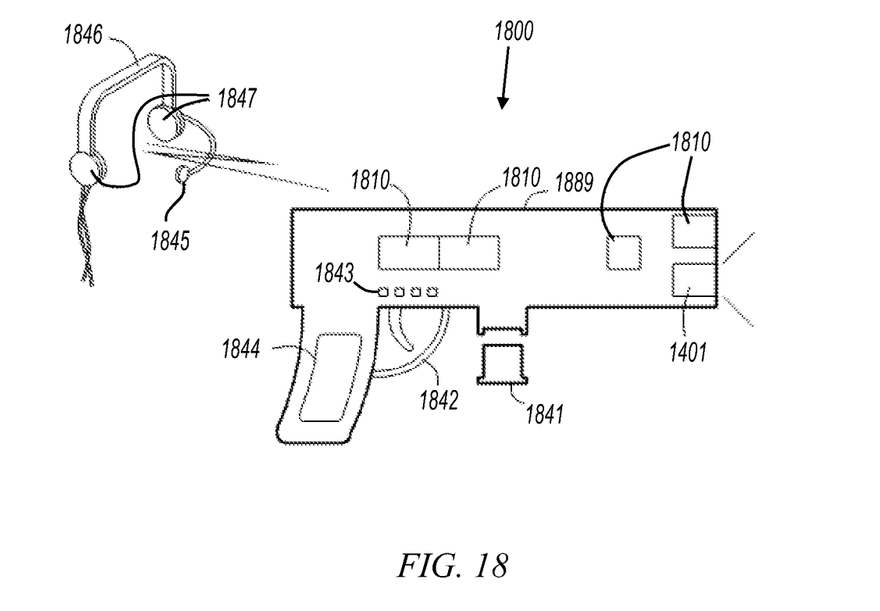
FIG. 18 shows a gaming apparatus in accordance with various embodiments of the present invention.

FIG. 18 shows a gaming apparatus in accordance with various embodiments of the present invention. Gaming apparatus 1800 allows a user or users to observe and interact with a gaming environment. The game is navigated based on the motion, position or orientation of gaming apparatus 1800, an apparatus that includes projection apparatus 1401. Other control interfaces, such as manually-operated buttons, foot pedals, or verbal commands, may also contribute to navigation around, or interaction with the gaming environment. For example, in some embodiments, trigger 1842 contributes to the illusion that the user or users are in a first person perspective video game environment, commonly known as a "first person shooter game." Because the projected display can be controlled by the gaming application in combination with the user's movement, gaming apparatus 1800 creates a highly believable or "immersive" environment for these users.

Many other first person perspective simulations can also be created by gaming apparatus 1800, for such activities as 3D seismic geo-prospecting, spacewalk planning, jungle canopy exploration, automobile safety instruction, medical education, etc. Tactile interface 1844 may provide a variety of output signals, such as recoil, vibration, shake, rumble, etc. Tactile interface 1844 may also include a touch-sensitive input feature, such as a touch sensitive display screen or a display screen that requires a stylus. Additional tactile interfaces, for example, input and/or output features for a motion sensitive probe are also included in various embodiments of the present invention.

Gaming apparatus 1800 may also include audio output devices, such as integrated audio speakers, remote speakers, or headphones. These sorts of audio output devices may be connected to gaming apparatus 1800 with wires or through a wireless technology. For example, wireless headphones 1846 provide the user with sound effects via a Bluetooth connection, although any sort of similar wireless technology could be substituted freely. In some embodiments, wireless headphones 1846 may include microphone 1845 or binaural microphone 1847, to allow multiple users, instructors, or observers to communicate. Binaural microphone 1847 typically includes microphones on each ear piece, to capture sounds modified by the user's head shadow. This feature may be used for binaural hearing and sound localization by other simulation participants.

Gaming apparatus 1800 may include any number of sensors 1810 that measure distance, ambient brightness, motion, position, orientation, and the like. For example, gaming apparatus 1800 may detect absolute heading with a digital compass, and detect relative motion with an x-y-z gyroscope or accelerometer. In some embodiments, gaming apparatus 1800 also includes a second accelerometer or gyroscope to detect the relative orientation of the device, or its rapid acceleration or deceleration. In other embodiments, gaming apparatus 1800 may include a Global Positioning Satellite (GPS) sensor, to detect absolute position as the user travels in terrestrial space.

Gaming apparatus 1800 may include battery 1841 and/or diagnostic lights 1843. For example, battery 1841 may be a rechargeable battery, and diagnostic lights 1843 could indicate the current charge of the battery. In another example, battery 1841 may be a removable battery clip, and gaming apparatus 1800 may have an additional battery, electrical capacitor or super-capacitor to allow for continued operation of the apparatus while the discharged battery is replaced with a charged battery. In other embodiments, diagnostic lights 1843 can inform the user or a service technician about the status of the electronic components included within or connected to this device. For example, diagnostic lights 1843 may indicate the strength of a received wireless signal, or the presence or absence of a memory card. Diagnostic lights 1843 could also be replaced by any small screen, such as an organic light emitting diode or liquid crystal display screen. Such lights or screens could be on the exterior surface of gaming apparatus 1800, or below the surface, if the shell for this apparatus is translucent or transparent.

Other components of gaming apparatus 1800 may be removable, detachable or separable from this device. For example, the projection apparatus 1401 may be detachable or separable from gaming housing 1849. In some embodiments, the subcomponents of the projection apparatus 1401 may be detachable or separable from gaming housing 1849, and still function.

Although the present invention has been described in conjunction with certain embodiments, it is to be understood that modifications and variations may be resorted to without departing from the scope of the invention as those skilled in the art readily understand. Such modifications and variations are considered to be within the scope of the invention and the appended claims.

What is claimed is:

1. A method comprising:
   generating a light beam modulated by pixel data;
   scanning the light beam to generate an image;
   shuttering the light beam during a period in which no pixel data is present, wherein shuttering the light beam during a period in which no pixel data is present comprises shuttering the light beam during a vertical flyback;
   modulating the light beam with calibration data while shuttered.

2. The method of claim 1 further comprising:
   detecting the light beam when modulated with calibration data; and
   modifying drive characteristics of a light source.

3. The method of claim 2 wherein modifying drive characteristics comprises modifying data in a luminance-to-current table.

4. The method of claim 1 wherein modulating the light beam with calibration data comprises modulating the light beam with at least two different amplitude values.

5. The method of claim 1 wherein shuttering the light beam comprises shuttering the light beam in a beam path prior to scanning.

6. The method of claim 1 wherein shuttering the light beam comprises shuttering the light beam in a beam path subsequent to scanning.

7. The method of claim 1 wherein shuttering the light beam comprises controlling a mechanical element in a beam path.

8. The method of claim 1 wherein shuttering the light beam comprises altering characteristics of a liquid crystal device in a beam path.

9. An apparatus comprising:
   a laser light source;
   a scanning mirror to reflect light from the laser light source and to scan the light onto an image plane;
   a shutter mechanism to conditionally block light from reaching the image plane, wherein the shutter mechanism comprises a liquid crystal device, wherein the shutter mechanism further comprises at least one wedge shaped optical component sharing an optical interface with the liquid crystal device, and wherein the shutter mechanism is oriented in a beam path so that an angle of incidence of light striking the optical interface is a non-normal angle; and
   a control component to activate the shutter mechanism and drive the laser light source with calibration data.

10. The apparatus of claim 9 wherein the liquid crystal device exhibits an effective index of refraction that varies with applied voltage, and the non-normal angle of incidence results in total internal reflection when a voltage is applied to the liquid crystal device.

11. An apparatus comprising:
    a laser light source;
    a scanning mirror to reflect light from the laser light source and to scan the light onto an image plane;
    a shutter mechanism to conditionally block light from reaching the image plane; and
    a control component to activate the shutter mechanism and drive the laser light source with calibration data;
    at least one light measurement component oriented to measure light when the shutter mechanism blocks light from reaching the image plane; and
    a mirror in a beam path to reflect less than all light in the beam path towards the at least one light measurement component.

12. A mobile device comprising:
a scanning laser projector that includes a liquid crystal shuttering mechanism to block light from leaving the mobile device during a calibration period, wherein the scanning laser projector comprises a light scanning apparatus that scans in two dimensions with a flyback period in one dimension.

13. The mobile device of claim 12 wherein the calibration period occurs within the flyback period.

* * * * *